(12) United States Patent
Wakabayashi et al.

(10) Patent No.: US 12,093,408 B2
(45) Date of Patent: Sep. 17, 2024

(54) CONTROLLER SYSTEM, CONTROL UNIT, AND NON-TRANSITORY COMPUTER READABLE MEDIUM

(71) Applicant: OMRON Corporation, Kyoto (JP)

(72) Inventors: Daisuke Wakabayashi, Kyoto (JP); Yuta Nagata, Kusatsu (JP)

(73) Assignee: OMRON Corporation, Kyoto (JP)

( * ) Notice: Subject to any disclaimer, the term of this patent is extended or adjusted under 35 U.S.C. 154(b) by 300 days.

(21) Appl. No.: 17/414,955

(22) PCT Filed: Dec. 19, 2019

(86) PCT No.: PCT/JP2019/049743
§ 371 (c)(1),
(2) Date: Jun. 17, 2021

(87) PCT Pub. No.: WO2020/158227
PCT Pub. Date: Aug. 6, 2020

(65) Prior Publication Data
US 2022/0058276 A1  Feb. 24, 2022

(30) Foreign Application Priority Data

Jan. 30, 2019  (JP) .................................. 2019-014166

(51) Int. Cl.
*G06F 21/60* (2013.01)
*G06F 21/00* (2013.01)
*G06F 21/57* (2013.01)

(52) U.S. Cl.
CPC .......... *G06F 21/606* (2013.01); *G06F 21/577* (2013.01)

(58) Field of Classification Search
CPC ........ G06F 21/577; G06F 21/50; G06F 21/55; G06F 21/554; G06F 21/56; G06F 21/566; G06F 21/567; G06F 21/57; G06F 21/70
See application file for complete search history.

(56) References Cited

U.S. PATENT DOCUMENTS

| 8,230,149 B1 * | 7/2012 | Long | G06F 21/85 |
| | | | 710/305 |
| 2009/0249464 A1 * | 10/2009 | Chang | H04L 63/145 |
| | | | 726/11 |

(Continued)

FOREIGN PATENT DOCUMENTS

| CN | 103403633 | 11/2013 |
| DE | 10248100 | 4/2004 |

(Continued)

OTHER PUBLICATIONS

"International Search Report (Form PCT/ISA/210) of PCT/JP2019/049743," mailed on Mar. 17, 2020, with English translation thereof, pp. 1-6.

(Continued)

*Primary Examiner* — Edward Zee
(74) *Attorney, Agent, or Firm* — JCIPRNET

(57) ABSTRACT

The present invention makes it possible to reduce threats to the security of a control unit. This controller system is provided with: a control unit that performs a control calculation for controlling a controlled object; and a security unit that is responsible for security. The control unit comprises: a first interface that brokers data exchange with an external device; a communication controller that is responsible for communication with the security unit; and a restriction means that restricts data from being exchanged with the external device via the first interface if a connection between the control unit and the security unit is detected via the communication controller.

11 Claims, 15 Drawing Sheets

(56) References Cited

U.S. PATENT DOCUMENTS

| | | | | |
|---|---|---|---|---|
| 2012/0311207 A1* | 12/2012 | Powers | ............... | G06F 13/385 |
| | | | | 710/106 |
| 2015/0020189 A1 | 1/2015 | Soffer | | |
| 2016/0373408 A1* | 12/2016 | Wentworth | ........... | G06F 21/606 |
| 2018/0293376 A1* | 10/2018 | El Abed | ................. | G06F 21/73 |

FOREIGN PATENT DOCUMENTS

| | | |
|---|---|---|
| DE | 102011007571 | 10/2012 |
| JP | H1173384 | 3/1999 |
| JP | 2005050313 | 2/2005 |
| JP | 2008080777 | 4/2008 |
| JP | 2008293241 | 12/2008 |
| JP | 2011100443 | 5/2011 |
| JP | 2014157483 | 8/2014 |
| JP | 2016081301 | 5/2016 |
| JP | 2016134137 | 7/2016 |
| JP | 2017215788 | 12/2017 |
| JP | 2018084894 | 5/2018 |
| JP | 2018120274 | 8/2018 |
| WO | 2017208364 | 12/2017 |
| WO | 2018115378 | 6/2018 |
| WO | 2018139627 | 8/2018 |

OTHER PUBLICATIONS

"Written Opinion of the International Searching Authority (Form PCT/ISA/237) of PCT/JP2019/049743," mailed on Mar. 17, 2020, with English translation thereof, pp. 1-8.

"Search Report of Europe Counterpart Application", issued on Aug. 25, 2022, p. 1-p. 9.

"Office Action of Japan Counterpart Application" with English translation thereof, issued on Feb. 8, 2022, p. 1-p. 6.

"Office Action of Japan Counterpart Application" with English translation thereof, issued on Jul. 12, 2022, p. 1-p. 8.

"Office Action of China Counterpart Application", issued on Dec. 7, 2023, with English translation thereof, pp. 1-19.

\* cited by examiner (a)

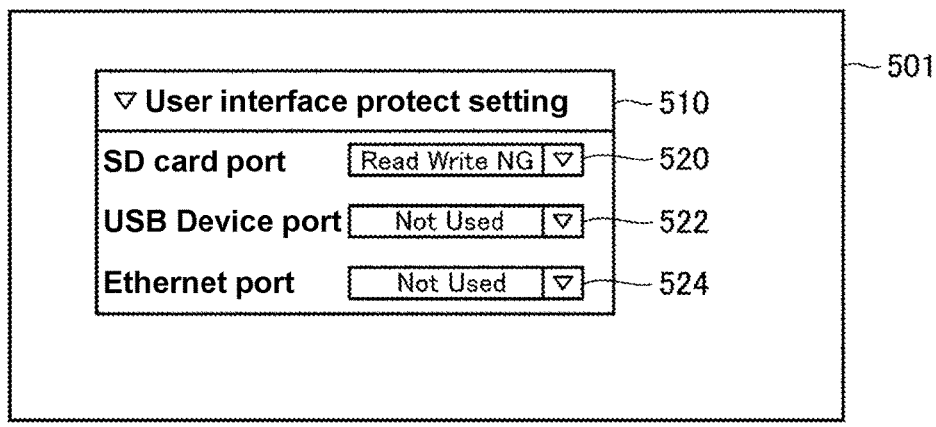

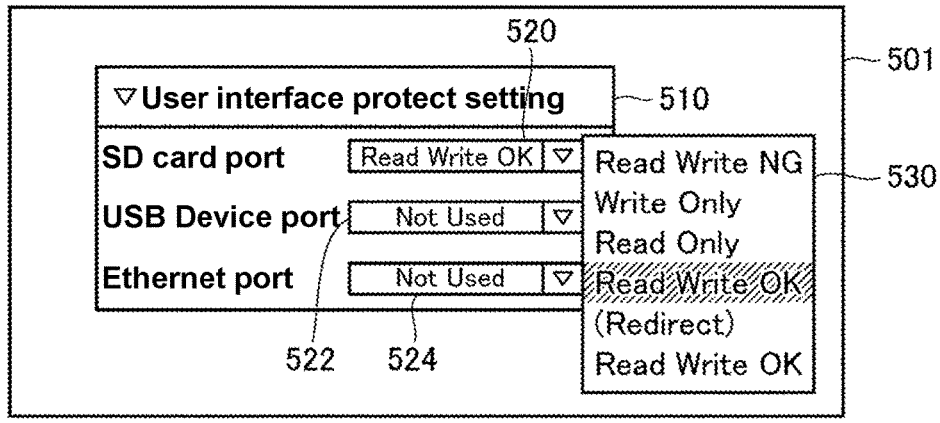

(b)

| Setting Option | Description |
| --- | --- |
| Read Write NG | Control unit: prohibit "reading" and "writing" |
| Write Only | Control unit: permit "writing" (prohibit "reading") |
| Read Only | Control unit: permit "reading" (prohibit "writing") |
| Read Write OK (Redirect) | Control unit: prohibit "writing" → permit "writing" performed by security unit |
| Read Write OK | Control unit: permit "reading" and "writing" |

| Setting Option | Description |
|---|---|
| Not Used | Control unit: prohibit bidirectional communication |
| One-Way (Incoming Only) | Control unit: permit only reception (prohibit transmission) |
| One-Way (Outgoing Only) | Control unit: permit only transmission (prohibit reception) |
| Two-Way | Control unit: permit bidirectional communication |

CONTROLLER SYSTEM, CONTROL UNIT, AND NON-TRANSITORY COMPUTER READABLE MEDIUM

CROSS-REFERENCE TO RELATED APPLICATION

This application is a 371 application of the International PCT application serial no. PCT/JP2019/049743, filed on Dec. 19, 2019, which claims the priority benefits of Japan Patent Application No. 2019-014166, filed on Jan. 30, 2019. The entirety of each of the above-mentioned patent applications is hereby incorporated by reference herein and made a part of this specification.

TECHNICAL FIELD

The present disclosure relates to an exchange of data through an interface in a controller system that controls a controlled object.

BACKGROUND ART

At production sites or the like using factory automation (FA), a programmable logic controller (PLC) or the like including a control unit is used to control various facilities and various devices disposed in each of the facilities. The control unit has an interface that mediates the exchange of data with an external device such as a secure digital (SD) memory card. The control unit reads out data stored in an external device through the interface, or writes data to the external device.

As an example of a technique in which a PLC and an external device exchange data through an interface, Japanese Patent Laid-Open No. 2008-293241 (Patent Literature 1) discloses that "an operation unit that accepts an operation command from a user, a first interface that transmits data to a PLC, a second interface to which a portable external memory is connected, and a control unit that reads out data written to the external memory connected to the second interface and transmits the data to the PLC through the first interface are provided."

CITATION LIST

Patent Literature

Patent Literature 1
Japanese Patent Laid-Open No. 2008-293241

SUMMARY OF INVENTION

Technical Problem

When data is exchanged between a control unit and an external device through an interface without any restrictions, important data such as confidential information may be leaked outside of the control unit, or malicious data such as a virus may be stored inside the control unit, which may pose a security threat. Therefore, there is a need for a technique that makes it possible to reduce a threat to the security of the control unit.

The present disclosure was contrived in view of such circumstances, and provides a technique that makes it possible to reduce a threat to the security of the control unit.

Solution to Problem

In an example of the present disclosure, a controller system includes a control unit that executes a control calculation for controlling a controlled object and a security unit that is responsible for security of the control unit. The control unit includes a first interface that mediates an exchange of data with an external device, a communication controller that is responsible for communication with the security unit, and a restriction means for restricting the data from being exchanged with the external device through the first interface when a connection between the control unit and the security unit is detected through the communication controller.

According to this disclosure, the controller system can reduce a threat to the security of the control unit by restricting a direct exchange of data between the external device and the control unit which may pose a security threat.

In an example of the present disclosure, the security unit further includes a second interface that mediates an exchange of data with the external device and a management means for managing an exchange of the data with the external device through the second interface. The management means permits the control unit to exchange the data with the external device through the second interface in a case where use of the first interface is restricted by the restriction means.

According to this disclosure, the controller system can reduce a threat to the security of the control unit by causing the security unit to be responsible for a direct exchange with the external device which may pose a security threat.

In an example of the present disclosure, the restriction means transmits data for the control unit to write to the external device through the first interface to the security unit through the communication controller in a case where the use of the first interface is restricted, and the management means permits the transmitted data for writing to be written to the external device through the second interface.

According to this disclosure, the controller system can select any of the first interface of the control unit and the second interface of the security unit as a data writing destination without changing the setting of a user program.

In an example of the present disclosure, the security unit further includes an evaluation part that evaluates safety of data that is exchanged with the external device. The management means transmits the data to the control unit in a case where the safety of the data that is exchanged with the external device is equal to or greater than a reference determined in advance, and stops transmitting the data to the control unit in a case where the safety of the data is less than the reference.

According to this disclosure, it is possible for the controller system to determine whether or not data can be transmitted to the control unit in accordance with the safety of the data that is read out from the external device through the second interface, and to more reliably reduce a threat to the security of the control unit.

In an example of the present disclosure, the security unit further includes a notification means for providing a notification to a user. The notification means provides a notification in a case where the safety of the data that is exchanged with the external device is less than the reference.

According to this disclosure, the controller system can notify a user that the security unit has detected data having low security safety.

In an example of the present disclosure, the external device is a storage medium capable of being attached to and detached from at least any of the first interface and the second interface.

According to this disclosure, the controller system can easily perform at least any of reading and writing of data through an interface.

In an example of the present disclosure, the restriction means performs any of only reading out data to and from the external device, only writing data to and from the external device, and prohibiting reading out and writing data to and from the external device.

According to this disclosure, the controller system can set a restriction according to the security safety of each external device for each interface by changing the content of setting information using a support device.

In an example of the present disclosure, the restriction means exchanges the data only with the external device determined in advance.

According to this disclosure, the controller system can prevent a security threat from an external device which is not previously authorized to exchange data.

In an example of the present disclosure, a control unit that executes a control calculation for controlling a controlled object includes a first interface that mediates an exchange of data with an external device, a communication controller that is responsible for communication with a security unit that is responsible for security of the control unit, and a restriction means for restricting the data from being exchanged with the external device through the first interface when a connection between the control unit and the security unit is detected through the communication controller.

According to this disclosure, the control unit can reduce a threat to the security of its own unit by restricting a direct exchange of data between the external device and its own unit which may pose a security threat.

In an example of the present disclosure, a control program of a control unit that executes a control calculation for controlling a controlled object causes the control unit to execute a step of detecting a connection between the control unit and the security unit through a communication controller that is responsible for communication with a security unit that is responsible for security of the control unit and a step of maintaining a state in which data is restricted from being exchanged with an external device through a first interface that mediates an exchange of the data with the external device.

According to this disclosure, the control program can reduce a threat to the security of the control unit by restricting a direct exchange of data between the external device and the control unit which may pose a security threat.

Advantageous Effects of Invention

According to the present disclosure, it is possible to reduce a threat to the security of the control unit.

BRIEF DESCRIPTION OF DRAWINGS

FIG. 12 is a diagram illustrating an example of a case where setting information in a memory card interface 113 is changed.

DESCRIPTION OF EMBODIMENTS

Figure 1:
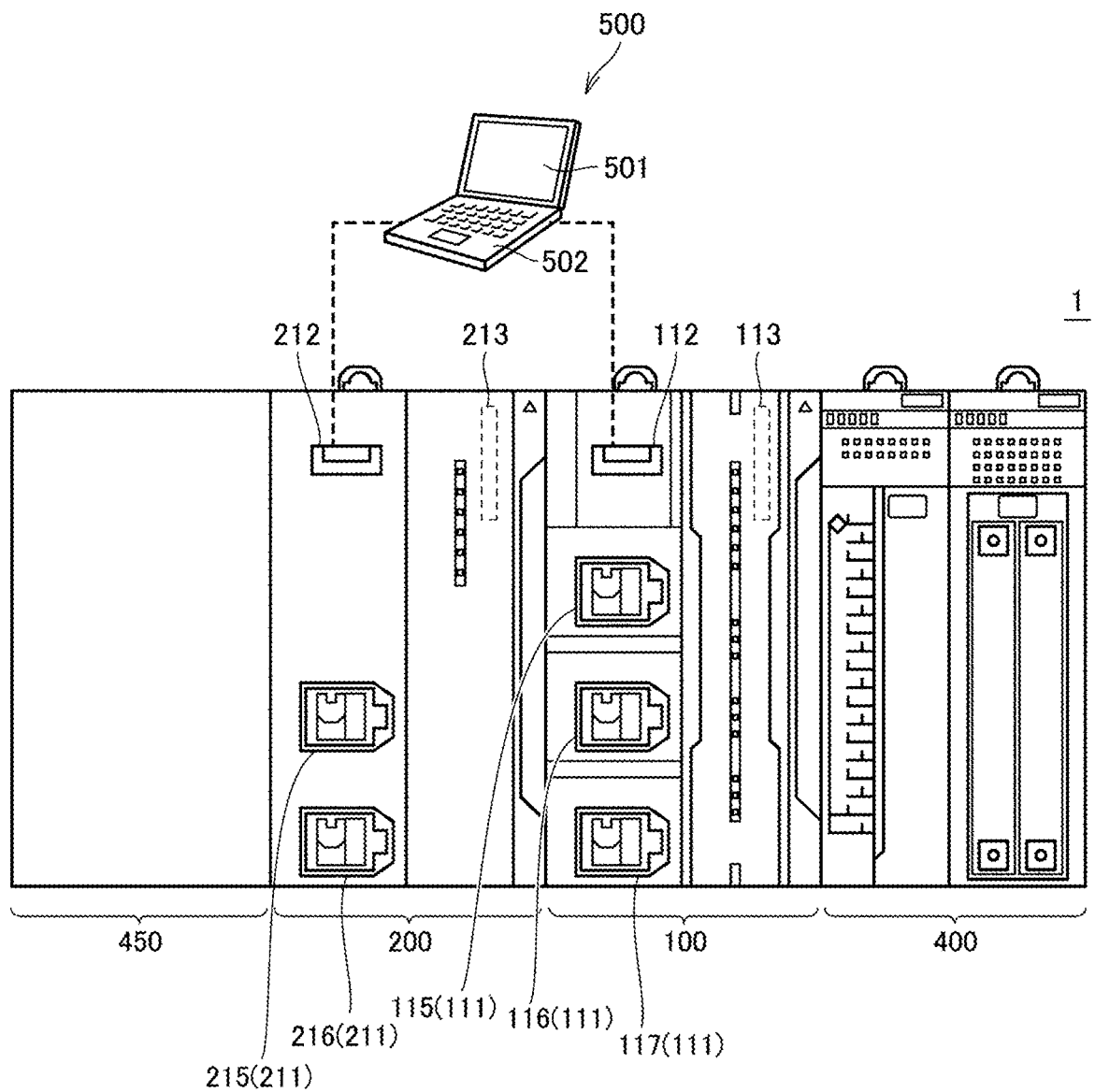
FIG. 1 is an appearance diagram illustrating a configuration example of a controller system 1 according to the present embodiment.

An embodiment of the present invention will be described in detail with reference to the accompanying drawings. Meanwhile, the same or equivalent portions in the drawings are denoted by the same reference numerals and signs, and thus description thereof will not be repeated.

<A. Controller System 1>

First, a configuration of a controller system 1 according to the present embodiment will be described.

FIG. 1 is an appearance diagram illustrating a configuration example of the controller system 1 according to the present embodiment. Referring to FIG. 1, the controller system 1 includes a control unit 100, a security unit 200, one or a plurality of function units 400, and a power supply unit 450. Meanwhile, the controller system 1 may include a support device 500 accessible to at least any of the control unit 100 and the security unit 200. The support device 500 includes a display part 501 that displays an image and an operation input part 502 that accepts a user's operation. The operation input part 502 includes, for example, at least any of a keyboard and a mouse.

The support device 500 is a device that supports preparations required for the control unit 100 to control a controlled object. Specifically, the support device 500 provides a development environment of a program which is executed by at least any of the control unit 100 and the security unit 200 and a setting environment for setting parameters (configurations) of various devices which are connected to at least any of the control unit 100 and the security unit 200. The development environment includes, for example, a program creation and editing tool, a parser, a compiler, or the like. In addition, the support device 500 provides a function of transmitting a user program to be described later to at least any of the control unit 100 and the security unit 200, a function of correcting and changing the user program or the like online, and the like.

The control unit 100 and the security unit 200 are connected to each other through any data transmission channel (such as, for example, PCI Express or Ethernet (registered trademark)). The control unit 100 and one or a plurality of function units 400 are connected to each other through an internal bus which is not shown.

The control unit 100 executes a central process in the controller system 1. The control unit 100 executes a control calculation for controlling a controlled object in accordance with an arbitrarily designed requirement specification. In the configuration example shown in FIG. 1, the control unit 100 has one or a plurality of interfaces. More specifically, the control unit 100 has interfaces including a Universal Serial Bus (USB) controller 112, a memory card interface 113, and network controllers 115, 116, and 117. Hereinafter, the network controllers 115, 116, and 117 of the control unit 100 are also referred to as a network controller 111 collectively.

The security unit 200 is connected to the control unit 100, and is responsible for the security of the control unit 100. In the configuration example shown in FIG. 1, the security unit 200 has one or a plurality of interfaces. More specifically, the security unit 200 has interfaces including a USB controller 212, a memory card interface 213, and network controllers 215 and 216. Hereinafter, the network controllers 215 and 216 of the security unit 200 are also referred to as a network controller 211 collectively.

The function unit 400 provides various functions for realizing control of various controlled objects performed by the controller system 1. The function unit 400 may typically include an I/O unit, a communication unit, a motion controller unit, a temperature adjustment unit, a pulse counter unit, or the like. Examples of the I/O unit include a digital input (DI) unit, a digital output (DO) unit, an analog input (AI) unit, an analog output (AO) unit, a pulse catch input unit, a composite unit in which a plurality of types is mixed, and the like.

The power supply unit 450 supplies power of a predetermined voltage to each unit constituting the controller system 1.

<B. Hardware Configuration Example of Each Unit>

Next, a hardware configuration example of each unit constituting the controller system 1 according to the present embodiment will be described.

(b1: Control Unit 100)

Figure 2:
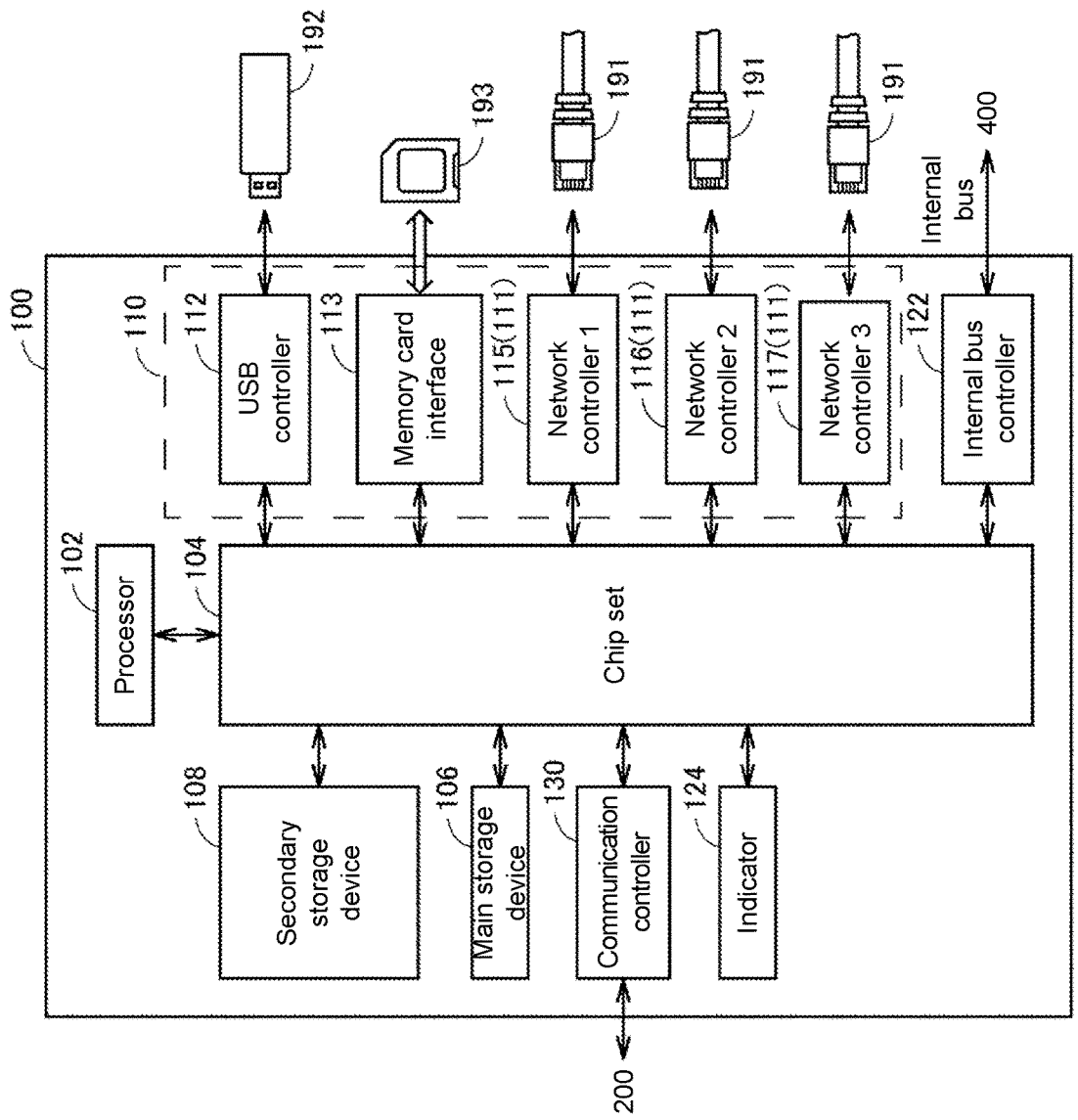
FIG. 2 is a schematic diagram illustrating a hardware configuration example of a control unit 100 constituting the controller system 1 according to the present embodiment.

FIG. 2 is a schematic diagram illustrating a hardware configuration example of the control unit 100 constituting the controller system 1 according to the present embodiment. Referring to FIG. 2, the control unit 100 includes, as main components, a processor 102 such as a central processing unit (CPU) or a graphical processing unit (GPU), a chip set 104, a main storage device 106, a secondary storage device 108, a communication controller 130, the Universal Serial Bus (USB) controller 112, the memory card interface 113, the network controllers 115, 116, and 117, an internal bus controller 122, and an indicator 124.

The processor 102 reads out various programs stored in the secondary storage device 108, and develops and executes the programs on the main storage device 106 to thereby realize a control calculation and various processes to be described later. The chip set 104 realizes processing of the entire control unit 100 by delivering data between the processor 102 and each component.

The secondary storage device 108 stores a control program that operates in an execution environment provided by a system program 180 in addition to a system program to be described later (for example, the system program 180 shown in (b) of FIG. 4 to be described later).

The communication controller 130 is responsible for communication with the security unit 200. As the communication controller 130, for example, a communication chip corresponding to PCI Express, Ethernet, or the like can be adopted.

The USB controller 112 is responsible for the exchange of data with any information processing device through USB connection. The USB controller 112 is configured such that, for example, a USB memory 192 can be attached and detached. More specifically, the USB controller 112 mediates reading of data such as the control program or various settings from the USB memory 192. Alternatively, the USB controller 112 mediates writing of data such as the control program or various settings to the USB memory 192.

The memory card interface 113 is responsible for the exchange of data with any information processing device. The memory card interface 113 is configured such that, for example, an SD memory card 193 can be attached and detached. More specifically, the memory card interface 113 mediates reading of data such as the control program or various settings from the SD memory card 193. Alternatively, the memory card interface 113 mediates writing of data such as the control program or various settings to the SD memory card 193.

The network controller 111 is responsible for the exchange of data with any device through a network. The network controller 111 configured such that, for example, a local area network (LAN) cable 191 can be attached and detached. The network controller 111 may employ industrial network protocols such as EtherCAT (registered trademark), EtherNet/IP (registered trademark), DeviceNet (registered trademark), or CompoNet (registered trademark).

In this manner, the USB controller 112, the memory card interface 113, and the network controller 111 are interfaces that mediate the exchange of data with an external device with respect to the control unit 100. Hereinafter, the USB controller 112, the memory card interface 113, and the network controller 111 are also referred to as a first interface 110 collectively.

The internal bus controller 122 is responsible for the exchange of data with one or a plurality of function units 400 constituting the controller system 1. For the internal bus, a manufacturer-specific communication protocol may be used, or a communication protocol which is the same as or based on any of industrial network protocols may be used.

The indicator 124 is used for notifying a user of the security safety, operation state, or the like of the control unit 100. It is constituted by one or a plurality of LEDs or the like disposed on the surface of the unit.

FIG. 2 shows a configuration example in which necessary functions are provided by the processor 102 executing a program, but some or all of these provided functions may be implemented using a dedicated hardware circuit (such as, for example, an application specific integrated circuit (ASIC) or a field-programmable gate array (FPGA)). Alternatively, a main part of the control unit 100 may be realized using hardware according to general-purpose architecture (for example, an industrial personal computer based on a general-purpose personal computer). In this case, a virtualization technique may be used to execute a plurality of operating systems (OSs) having different uses in parallel and to execute a necessary application on each OS.

(b2: Security Unit 200)

Figure 3:
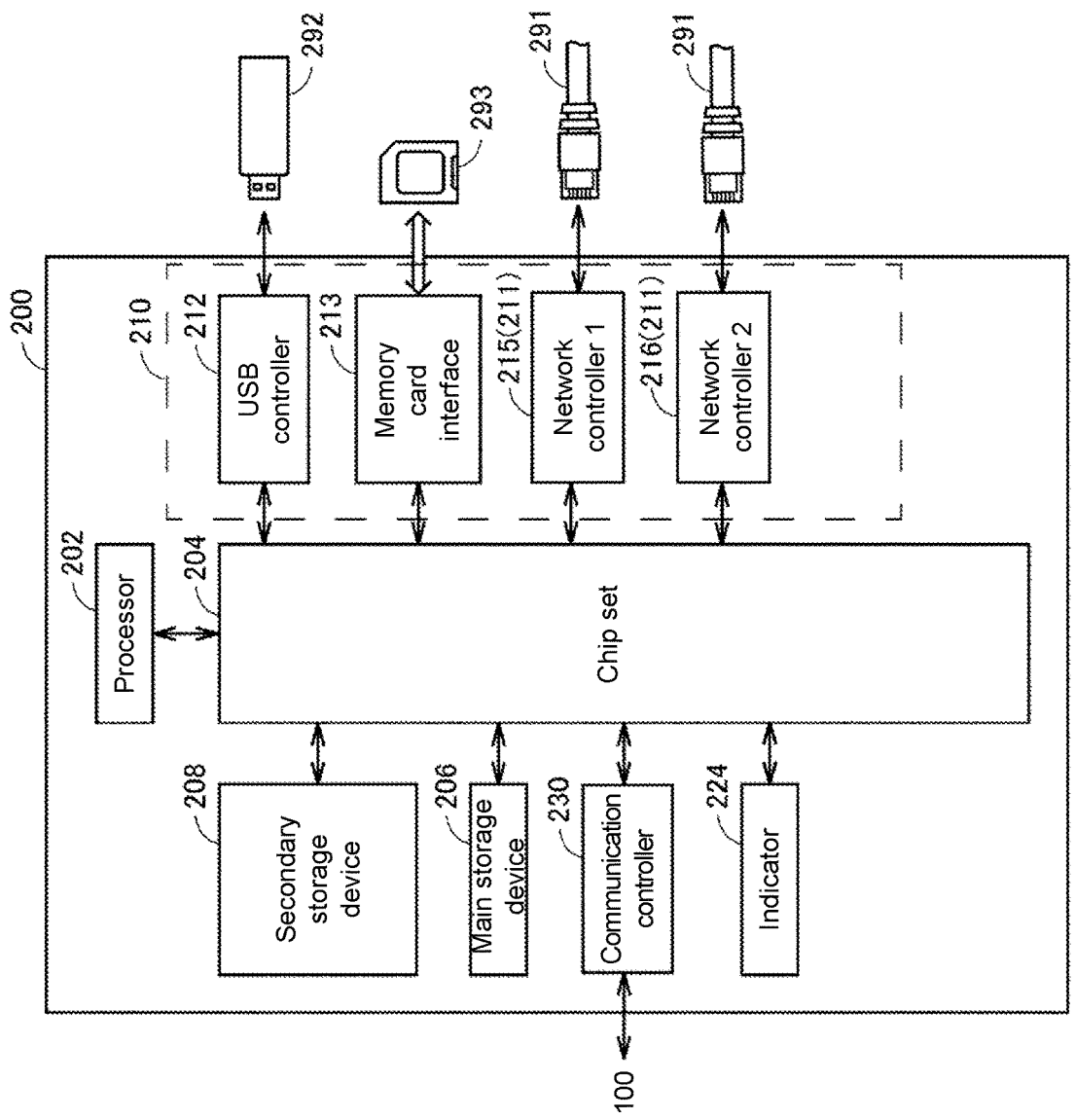
FIG. 3 is a schematic diagram illustrating a hardware configuration example of a security unit 200 constituting the controller system 1 according to the present embodiment.

FIG. 3 is a schematic diagram illustrating a hardware configuration example of the security unit 200 constituting the controller system 1 according to the present embodiment. Referring to FIG. 3, the security unit 200 includes, as main components, a processor 202 such as a CPU or a GPU, a chip set 204, a main storage device 206, a secondary storage device 208, a communication controller 230, the USB controller 212, the memory card interface 213, the network controllers 215 and 216, and an indicator 224.

The processor 202 reads out various programs stored in the secondary storage device 208, and develops and executes the programs in the main storage device 206 to thereby realize the security of the control unit 100. The chip set 204 realizes processing of the entire security unit 200 by delivering data between the processor 202 and each component.

The secondary storage device 208 stores a security system program that operates in an execution environment provided by a system program 280 in addition to a system program to be described later (for example, the system program 280 shown in (b) of FIG. 4 to be described later).

The communication controller 230 is responsible for communication with the control unit 100. As the communication controller 230, for example, a communication chip corresponding to PCI Express, Ethernet, or the like can be adopted similarly to the communication controller 130 of the control unit 100.

The USB controller 212 is responsible for the exchange of data with any information processing device through USB connection. The USB controller 212 is configured such that, for example, a USB memory 292 can be attached and detached. More specifically, the USB controller 212 mediates reading of data such as the control program or various settings from the USB memory 292. Alternatively, the USB controller 212 mediates writing of data such as the control program or various settings to the USB memory 292.

The memory card interface 213 is responsible for the exchange of data with any information processing device. The memory card interface 213 is configured such that, for example, an SD memory card 293 can be attached and detached. More specifically, the memory card interface 213 mediates reading of data such as the control program or various settings from the SD memory card 293. Alternatively, the memory card interface 213 mediates writing of data such as the control program or various settings to the SD memory card 293.

The network controller 211 is responsible for the exchange of data with any device through a network. The network controller 211 is configured such that, for example, a LAN cable 291 can be attached and detached. The network controller 211 may employ a general-purpose network protocol such as Ethernet.

In this manner, the USB controller 212, the memory card interface 213, and the network controller 211 are interfaces that mediate the exchange of data with an external device with respect to the security unit 200. Hereinafter, the USB controller 212, the memory card interface 213, and the network controller 211 are also referred to as a second interface 210 collectively.

The external device including the USB memory, the SD memory card, and the LAN cable in the above description is a storage medium capable of being attached to and detached from at least any of the first interface 110 and the second interface 210. Thereby, the controller system 1 can easily perform at least any of reading and writing of data through an interface.

The indicator 224 is used for notifying a user of the security safety, operation state, or the like of the security unit 200. It is constituted by one or a plurality of LEDs or the like disposed on the surface of the unit.

FIG. 3 shows a configuration example in which necessary functions are provided by the processor 202 executing a program, but some or all of these provided functions may be implemented using a dedicated hardware circuit (such as, for example, an ASIC or an FPGA). Alternatively, a main part of the security unit 200 may be realized using hardware according to general-purpose architecture (for example, an industrial personal computer based on a general-purpose personal computer). In this case, a virtualization technique may be used to execute a plurality of operating systems (OS) having different uses in parallel and to execute a necessary application on each OS.

<C. Whether Or Not the First Interface 110 Can Be Used>

Next, a process of reducing a threat to the security of the control unit 100 of the controller system 1 according to the present embodiment will be described. FIG. 4 is a diagram illustrating whether or not the first interface 110 can be used according to a connection state between the control unit 100 and the security unit 200.

Figure 4:
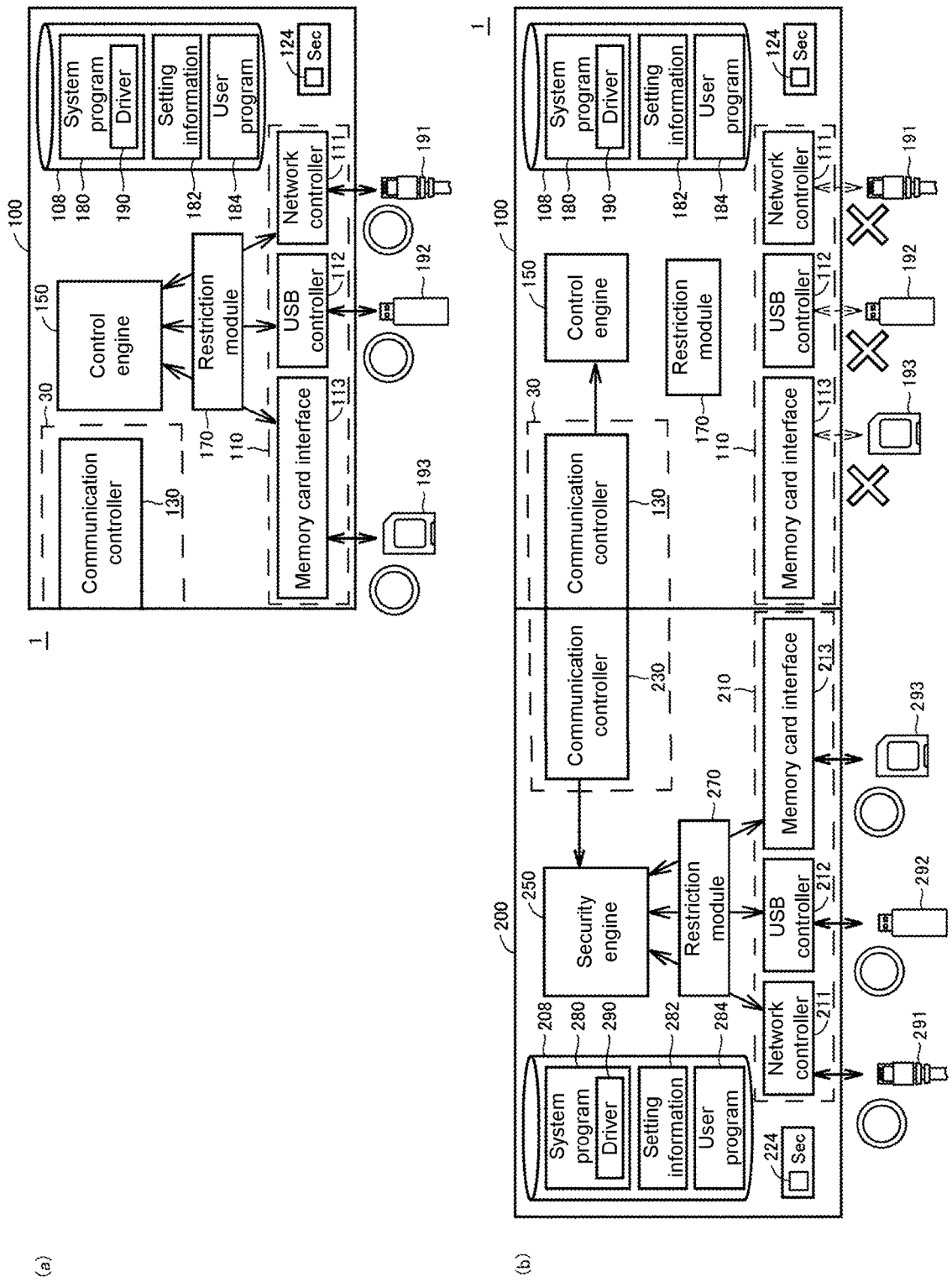
FIG. 4 is a diagram illustrating whether or not a first interface 110 can be used according to a connection state between the control unit 100 and the security unit 200.

Referring to (a) of FIG. 4, in a case where the control unit 100 and the security unit 200 are in an electrically disconnected state, data can be exchanged between the control unit 100 and an external device through the first interface 110. The wording "the control unit 100 and the security unit 200 are in a disconnected state" includes a case where the control unit 100 is electrically connected to a unit other than the security unit 200. The other unit is, for example, the function unit 400 or the like.

The control unit 100 includes the secondary storage device 108, the first interface 110 (the USB controller 112, the memory card interface 113, and the network controller 111), and the communication controller 130 described with reference to FIG. 2.

The secondary storage device 108 of the control unit 100 includes the system program 180, setting information 182, and a user program 184.

The system program 180 includes a driver 190 which is a control program for using the first interface 110.

The setting information 182 is information for defining the configuration and setting of the control unit 100. More specifically, the setting information 182 includes information for a restriction module 170 to be described later to determine whether or not data can be exchanged through the first interface 110. Data is exchanged between a control engine 150 to be described later and an external device. Meanwhile, the setting information 182 can be set in advance or the set content thereof can be changed by a user's operation using the support device 500. The change of the setting information 182 or the like will be described later.

The user program 184 is created in accordance with the control purpose of a user. That is, this user program is a program which is arbitrarily designed in accordance with a line (process) or the like to be controlled using the control unit 100. The user program 184 realizes the control purpose of a user, for example, in cooperation with a sequence program. That is, the user program 184 realizes a programmed operation by using commands, functions, function modules, and the like provided by the sequence program.

In addition, the control unit 100 includes the control engine 150 and the restriction module 170. When the supply of power from the power supply unit 450 to the control unit 100 is started, the processor 102 acquires the system program 180 and the setting information 182 which are stored in the secondary storage device 108 from the secondary storage device 108, and develops them in the main storage device 106. Thereby, the processor 102 functions as the control engine 150 and the restriction module 170.

The control engine 150 exchanges data with an external device through the mediation of the first interface 110.

The restriction module 170 detects the presence or absence of the connection between the control unit 100 and the security unit 200 through the communication controller 130. In a case where the connection between the control unit 100 and the security unit 200 is not detected, the restriction module 170 permits the control engine 150 and an external device to exchange data with each other through the first interface 110 on the basis of the setting information 182. The setting information 182 is set in advance so that, in a case where the control unit 100 and the security unit 200 are in a disconnected state, the driver 190 that controls the first interface 110 is validated, and the restriction module can mediate the exchange of data between the control unit 100 and an external device.

Next, referring to (b) of FIG. 4, in a case where the control unit 100 and the security unit 200 are in an electrically connected state, the exchange of data between the control unit 100 and an external device through the first interface 110 is restricted.

The restriction module 170 detects the presence or absence of the connection between the control unit 100 and the security unit 200 through the communication controller 130. When the connection between the control unit 100 and the security unit 200 is detected, the restriction module 170 restricts the exchange of data on the basis of the setting information 182. The setting information 182 is set in advance so that, in a case where the control unit 100 and the security unit 20 are in a connected state, the driver 190 that controls the first interface 110 is invalidated, and it is not possible to mediate the exchange of data between the control unit 100 and an external device. The restriction module 170 restricts data from being exchanged between the control engine 150 and an external device through the first interface 110 on the basis of the setting information 182. The controller system 1 can reduce a threat to the security of the control unit 100 by restricting a direct exchange of data between an external device and the control unit 100 which may pose a security threat.

Figure 5:
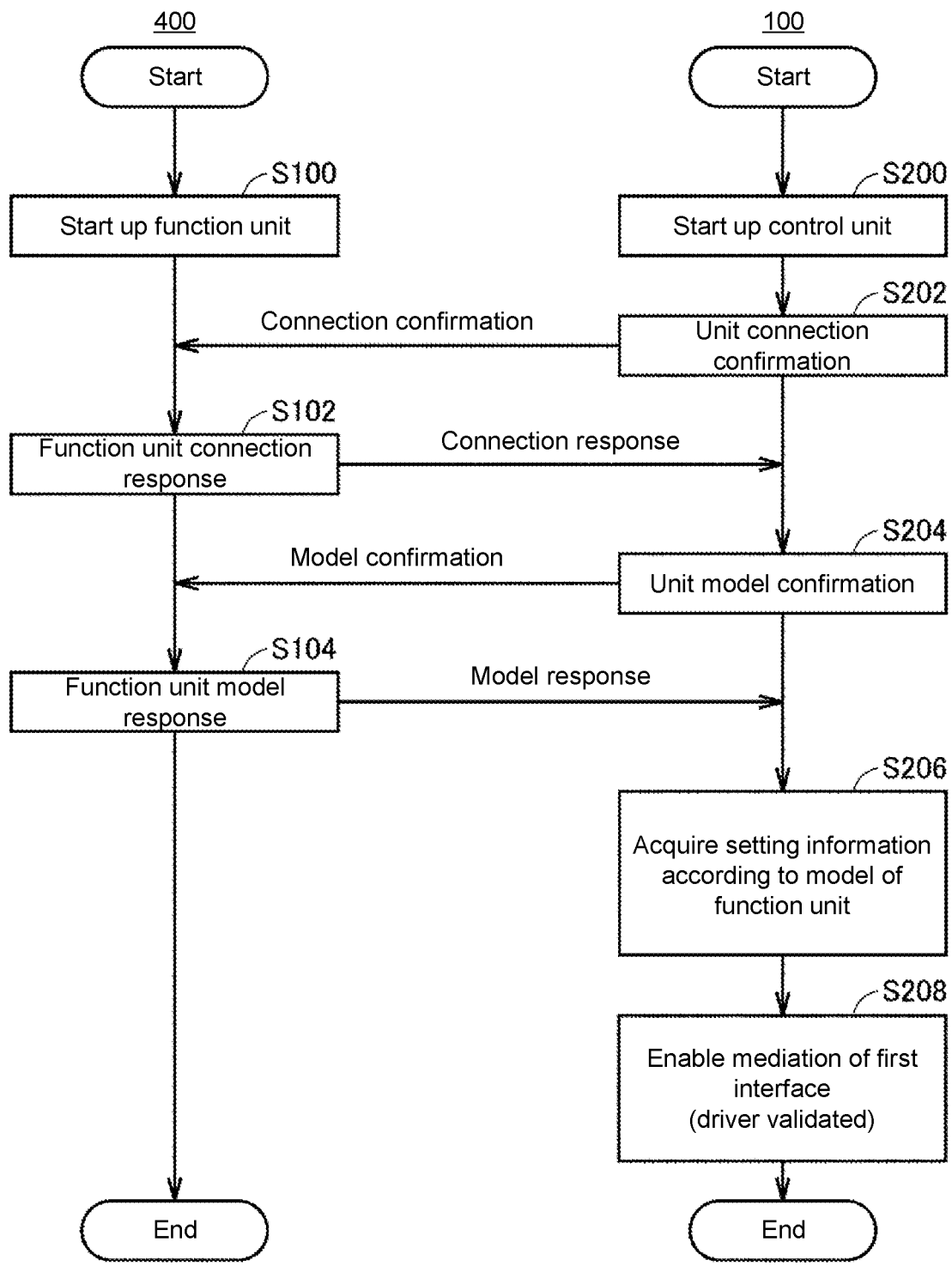
FIG. 5 is a flow chart illustrating a processing procedure in a case where the control unit 100 and the security unit 200 in the controller system 1 are in a disconnected state.
Figure 6:
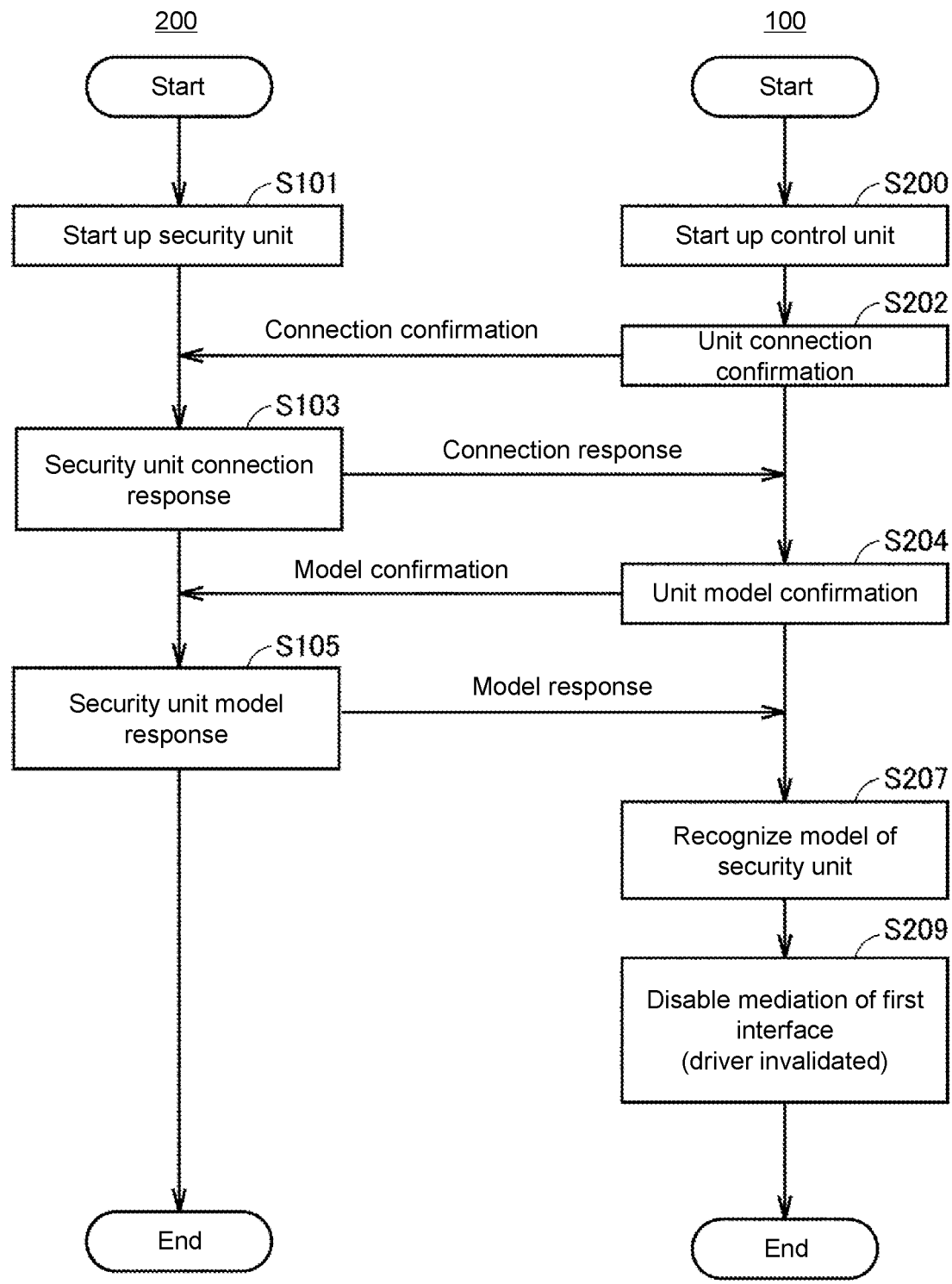
FIG. 6 is a flow chart illustrating a processing procedure in a case where the control unit 100 and the security unit 200 in the controller system 1 are in a connected state.

FIGS. 5 and 6 show processing procedures according to the presence or absence of a connection state between the control unit 100 and the security unit 200 in the controller system 1.

FIG. 5 is a flow chart illustrating a processing procedure in a case where the control unit 100 and the security unit 200 in the controller system 1 are in a disconnected state. Meanwhile, in the process of FIG. 5, the function unit 400 which is a unit other than the security unit 200 will be described as being connected to the control unit 100.

Referring to FIG. 5, the function unit 400 starts up through the supply of power from the power supply unit 450 (step S100).

In addition, the control unit 100 starts up through the supply of power from the power supply unit 450 (step S200).

Next, the control unit 100 confirms the presence or absence of the connection of a unit through the communication controller 130 (step S202). The control unit 100 transmits, for example, a signal for connection confirmation through the communication controller 130.

The function unit 400 responds to the control unit 100 by receiving the connection confirmation from the control unit 100 (step S102). The function unit 400 transmits, for example, a signal of a connection response through the communication controller.

The control unit 100 performs a model confirmation by receiving the connection response (step S204). More specifically, the control unit 100 transmits a signal for confirming which unit is connected through the communication controller 130.

The function unit 400 makes a response to transmit the model of its own unit to the control unit 100 by receiving the model confirmation from the control unit 100 (step S104).

The control unit 100 acquires the setting information 182 according to a model together with the system program 180 from the secondary storage device 108 by receiving the model response (step S206).

The control unit 100 validates the driver 190 included in the system program 180 to enable the exchange of data between the control engine 150 and an external device through the first interface 110 (step S208).

Next, FIG. 6 is a flow chart illustrating a processing procedure in a case where the control unit 100 and the security unit 200 in the controller system 1 are in a connected state.

Referring to FIG. 6, the security unit 200 starts up the supply of power from the power supply unit 450 (step S101).

In addition, the control unit 100 starts up through the supply of power from the power supply unit 450 (step S200).

Next, the control unit 100 confirms the presence or absence of the connection of a unit through the communication controller 130 (step S202). The control unit 100 transmits, for example, a signal for connection confirmation through the communication controller 130.

The security unit 200 responds to the control unit 100 by receiving the connection confirmation from the control unit 100 (step S103). The security unit 200 transmits, for example, a signal of a connection response through the communication controller 230.

The control unit 100 performs a model confirmation by receiving the connection response (step S204). More specifically, the control unit 100 transmits a signal for confirming which unit is connected through the communication controller 130.

The security unit 200 makes a response to transmit the model of its own unit to the control unit 100 by receiving the model confirmation from the control unit 100 (step S105).

The control unit 100 acquires the setting information 182 according to a model together with the system program 180 from the secondary storage device 108 (step S207).

The control unit 100 invalidates the driver 190 included in the system program 180 to restrict data from being exchanged between the control engine 150 and an external device through the first interface 110 (step S209). The control unit 100 disables, for example, the exchange of data between the control engine 150 and an external device through the first interface 110. In a case where the control unit 100 is connected to the security unit 200, it can set the operating mode of its own unit to a mode for improving security safety.

In this manner, in a case where the restriction module 170 restricts data from being exchanged between the control unit 100 and an external device, data can be exchanged through the second interface of the security unit 200. More specifically, a management module 270 of the security unit 200 to be described later permits the exchange of data between the control engine 150 and an external device through the second interface 210.

Referring to (b) of FIG. 4, the security unit 200 includes the secondary storage device 208, the second interface 210, the communication controller 230, and the indicator 224 described with reference to FIG. 3.

The secondary storage device 208 of the security unit 200 includes the system program 280, setting information 282, and a user program 284.

The system program 280 includes a driver 290 which is a control program for using the second interface 210.

The setting information 282 is information for defining the configuration and setting of the security unit 200. More specifically, the setting information 282 includes information for the management module 270 to be described later to determine whether or not data can be exchanged through the second interface 210. Data is exchanged between a security engine 250 to be described later and an external device.

The user program 284 is created in accordance with the control purpose of a user. That is, this user program is a program which is arbitrarily designed in accordance with a line (process) or the like to be controlled using the security unit 200. The user program 284 realizes the control purpose of a user, for example, in cooperation with a sequence program. That is, the user program 284 realizes a programmed operation by using commands, functions, function modules, and the like provided by the sequence program.

In addition, the security unit 200 includes the security engine 250 and the management module 270. When the supply of power from the power supply unit 450 to the security unit 200 is started, the processor 202 acquires the system program 280 and the setting information 282 which are stored in the secondary storage device 208 from the secondary storage device 208, and develops them in the main storage device 206. Thereby, the processor 202 functions as the security engine 250 and the management module 270.

The security engine 250 exchanges data with an external device through the mediation of the second interface 210.

In a case where the use of the first interface 110 is restricted by the restriction module 170, the management module 270 permits the exchange of data with an external device through the second interface 210. For example, in a case where data is transmitted from the control engine 150 to the security engine 250 through the communication controller 130 and the communication controller 230, the management module 270 permits the data to be written from the security engine 250 to an external device through the second interface 210. The data is, for example, data for writing from the control engine 150 to an external device. Meanwhile, hereinafter, the communication controller 130 and the communication controller 230 are also referred to as a communication controller 30 collectively.

In addition, the management module 270 permits, for example, data to be read out from an external device to the security engine 250 through the second interface 210. The data is, for example, data for reading out from an external device to the control engine 150. The read-out data is transmitted from the security engine 250 to the control engine 150 through the communication controller 30.

The setting information 282 is set in advance so that, in a case where the control unit 100 and the security unit 200 are in a connected state, the driver 290 that controls the second interface 210 is validated, and the management module can mediate the exchange of data between the security unit 200 and an external device. The controller system 1 can reduce a threat to the security of the control unit 100 by causing the security unit 200 to be responsible for a direct exchange with an external device which may pose a security threat.

<D. Process of Writing Data in Case Where Use of First Interface 110 is Restricted>

A process of writing data in a case where the use of the first interface 110 is restricted will be described with reference to FIGS. 7 and 8.

Figure 7:
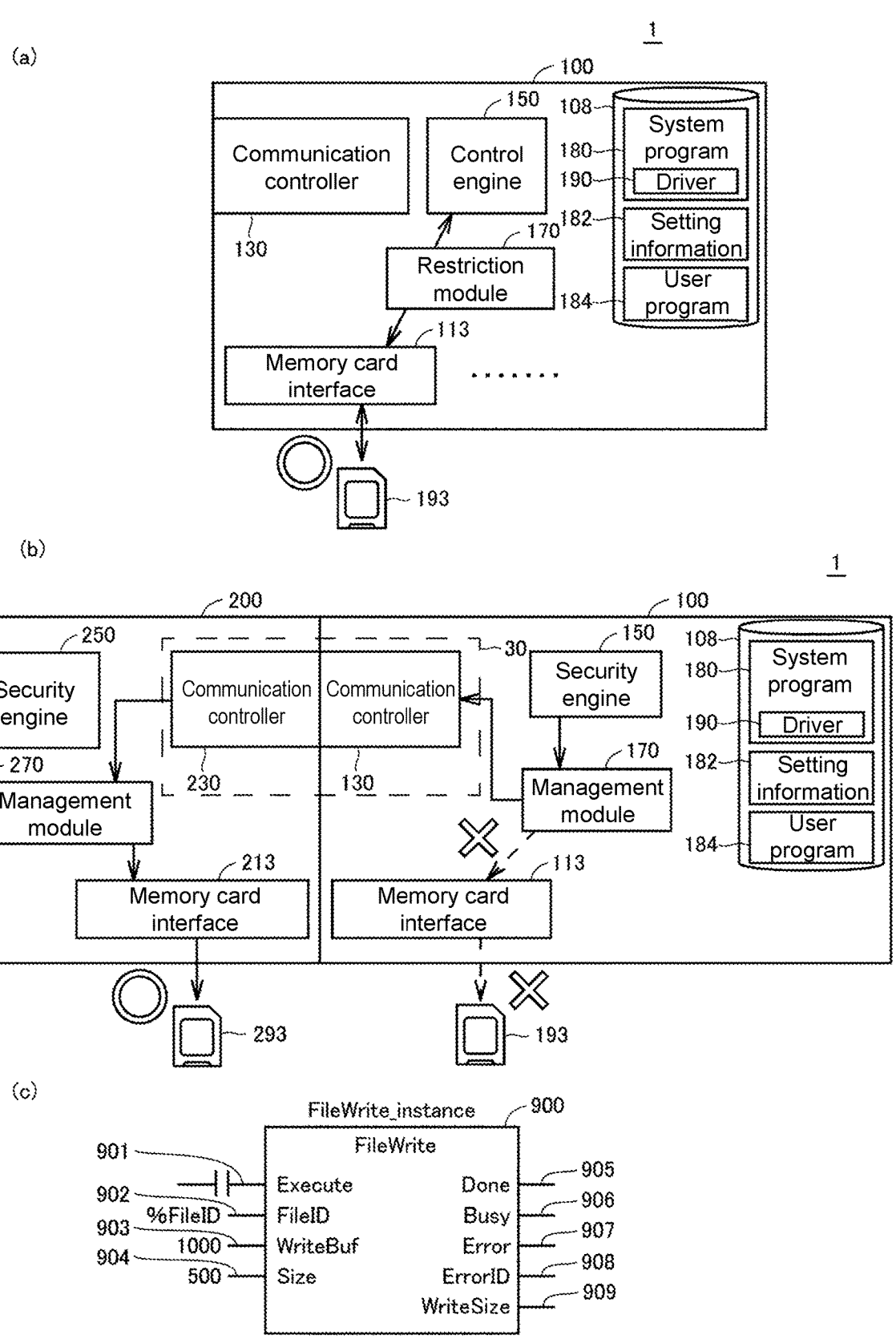
FIG. 7 is a diagram illustrating that a data writing destination is changed in accordance with a connection state of the security unit 200 without changing the content of a user program.

FIG. 7 is a diagram illustrating that a data writing destination is changed in accordance with a connection state of the security unit 200 without changing the content of a user program. Referring to (a) of FIG. 7, the processor 102 executes the user program 184 in the control unit 100. The content of the user program 184 is the content of writing data to the SD memory card 193 between the control engine 150 and the memory card interface 113 through the first interface 110. The restriction module 170 detects the presence or absence of the connection to the security unit 200. In the case of disconnection from the security unit 200, the restriction module 170 permits data to be written to the SD memory card 193 through the memory card interface 113 on the basis of the setting information 182.

Next, referring to (b) of FIG. 7, similarly to (a) of FIG. 7 described above, the processor 102 executes the user program 184 in the control unit 100. Here, in the case of connection to the security unit 200, the restriction module 170 prohibits data from being written to the SD memory card 193 through the memory card interface 113 on the basis of the setting information 182. In a case where the use of the first interface is restricted in this manner, the restriction module 170 transmits data for writing to the SD memory card in the control engine 150 to the security unit 200 through the communication controller 30.

The management module 270 of the security unit 200 permits the data transmitted through the communication controller 30 to be written to the SD memory card 293 through the memory card interface 213 on the basis of the setting information 282.

(c) of FIG. 7 is a diagram illustrating an example of a function block 900 when writing is executed with the same content of the user program 184 in both FIGS. 7(a) and 7(b). The function block 900 represents one function included in the user program 184.

Referring to (c) of FIG. 7, the function block 900 includes input parts 901 to 904 and output parts 905 to 909. The input parts 901 to 904 accept settings related to a process of writing to the SD memory card 193 through the memory card interface 113. The output parts 905 to 909 output results of processing of the settings.

The input parts 901 to 904 accept setting inputs to the restriction module 170. Examples of the values are specific values such as "FileID," "WriteBUf," and "Size" as will be described below.

The input part 901 indicated as "Execute" accepts a setting for specifying whether or not to execute the process. As an example, the input part 901 accepts an input of "True" or "False."

The input part 902 indicated as "FileID" accepts an input regarding the file ID of a file to be written to the SD memory card 193. The input part 902 accepts an input of "% FileID" as an example.

The input part 903 indicated as "WriteBuf" accepts an input related to data to be written to the SD memory card 193. The input part 903 accepts an input of "1000" as an example.

The input part 904 indicated as "Size" accepts an input related to the number of elements to be written to the SD memory card 193. The input part 904 accepts an input of "500" as an example.

In a case where the setting is performed normally, a signal indicating normal termination is output from the output part 905 indicated as "Done." A signal indicating that a setting process is in progress is output from the output part 906 indicated as "Busy." In a case where the setting is not performed normally, a signal indicating abnormal termination is output from the output part 907. In this case, an error ID for identifying the content of an error is further output from the output part 908. In addition, the number of elements actually written to the SD memory card 193 is output from the output part 909.

The user program 184 including the function block 900 shown in (c) of FIG. 7 is executed in both processes of FIGS. 7(*a*) and 7(*b*). More specifically, the controller system 1 can select any of the first interface 110 of the control unit 100 and the second interface 210 of the security unit 200 as a data writing destination without changing the setting of the user program 184. The setting of the user program 184 is, for example, the content of data which is input to each input part of the function block 900.

Figure 8:
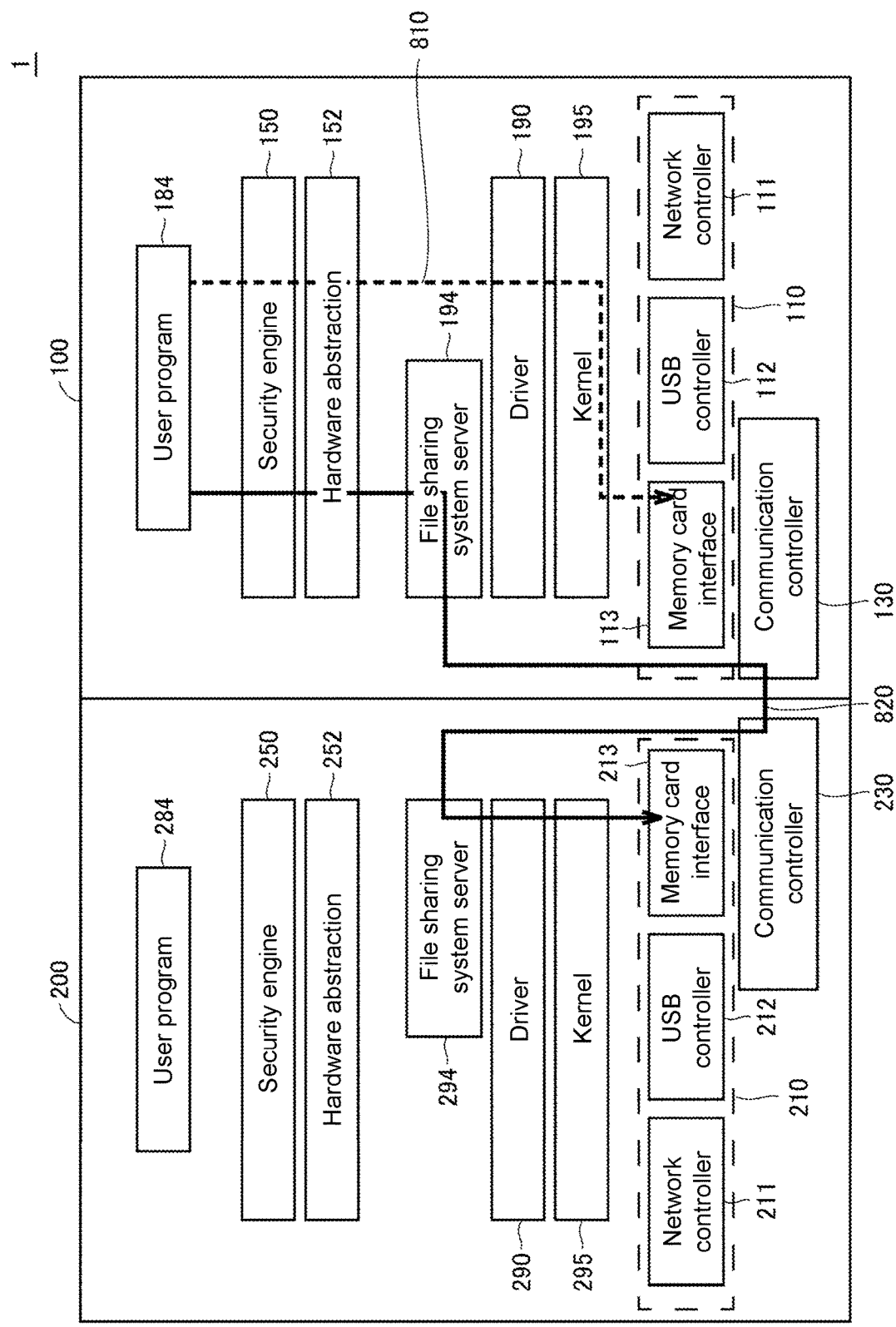
FIG. 8 is a diagram illustrating a change of the data writing destination in more detail.

FIG. 8 is a diagram illustrating a change of a data writing destination in more detail. The control unit 100 in the controller system of FIG. 8 includes the user program 184, the control engine 150, the driver 190, the first interface 110, and the communication controller 130 described with reference to FIG. 7 and the like. The control unit 100 includes a hardware abstraction 152, a kernel 195, and a file sharing system client 194 in addition to these components.

The security unit 200 includes the user program 284, the security engine 250, the driver 290, the second interface 210, and the communication controller 230 described with reference to FIG. 7 and the like. The security unit 200 includes a hardware abstraction 252, a kernel 295, and a file sharing system server 294 in addition to these components.

The kernel 195 in the control unit 100 is a program that prepares for the startup of a computer program executed on an OS and allocates a required memory area from a memory space.

The hardware abstraction 152 is a program which is installed between the kernel 195 and hardware including the first interface 110. It is a program that hides differences in control methods or operation methods that differ depending on individual hardware, and enables the kernel 195 to be controlled by common specifications.

The kernel 295 in the security unit 200 has the same function as the kernel 195 in the control unit 100 described above. In addition, the hardware abstraction 252 in the security unit 200 has the same function as the hardware abstraction 152 in the control unit 100. That is, the kernel 195 in the security unit 200 is a program that prepares for the startup of a computer program executed on an OS and allocates a required memory area from a memory space. In addition, the hardware abstraction 252 is a program which is installed between the kernel 295 and hardware including the second interface 210. It is a program that hides differences in control methods or operation methods that differ depending on individual hardware, and enables the kernel 295 to be controlled by common specifications.

The user program 184 is executed in the control unit 100. In a case where the security unit 200 is in a disconnected state, the driver 190 is validated, and data for writing is written to the SD memory card 193 through the first interface 110. The first interface 110 in this case is, for example, the memory card interface 113. In a case where the security unit 200 is in a disconnected state in this manner, a process of executing the user program 184 shown by an arrow 810 of a broken line to a process of writing data through the memory card interface 113 are executed.

On the other hand, in a case where the security unit 200 is in a connected state, the user program 184 is similarly executed in the control unit 100. However, the driver 190 is not validated, and the file sharing system client 194 transmits the data for writing to the security unit 200 through the communication controller 30. The file sharing system client 194 is equivalent to, for example, a portion of the functions of the restriction module 170 described so far.

The file sharing system server 294 of the security unit 200 writes the data received through the communication controller 30 to an external device through the second interface 210. The second interface 210 in this case is, for example, the memory card interface 213. The file sharing system server 294 is equivalent to, for example, a portion of the functions of the management module 270 described so far. In a case where the security unit 200 is in a connection state, a process of executing the user program 184 of an arrow 820 of a solid line to a process of writing data through the memory card interface 213 are executed. Thereby, the controller system 1 can select any of the first interface 110 of the control unit 100 and the second interface 210 of the security unit 200 as a data writing destination without changing the setting of the user program 184.

<E. Process According to Safety of Data>

Figure 9:
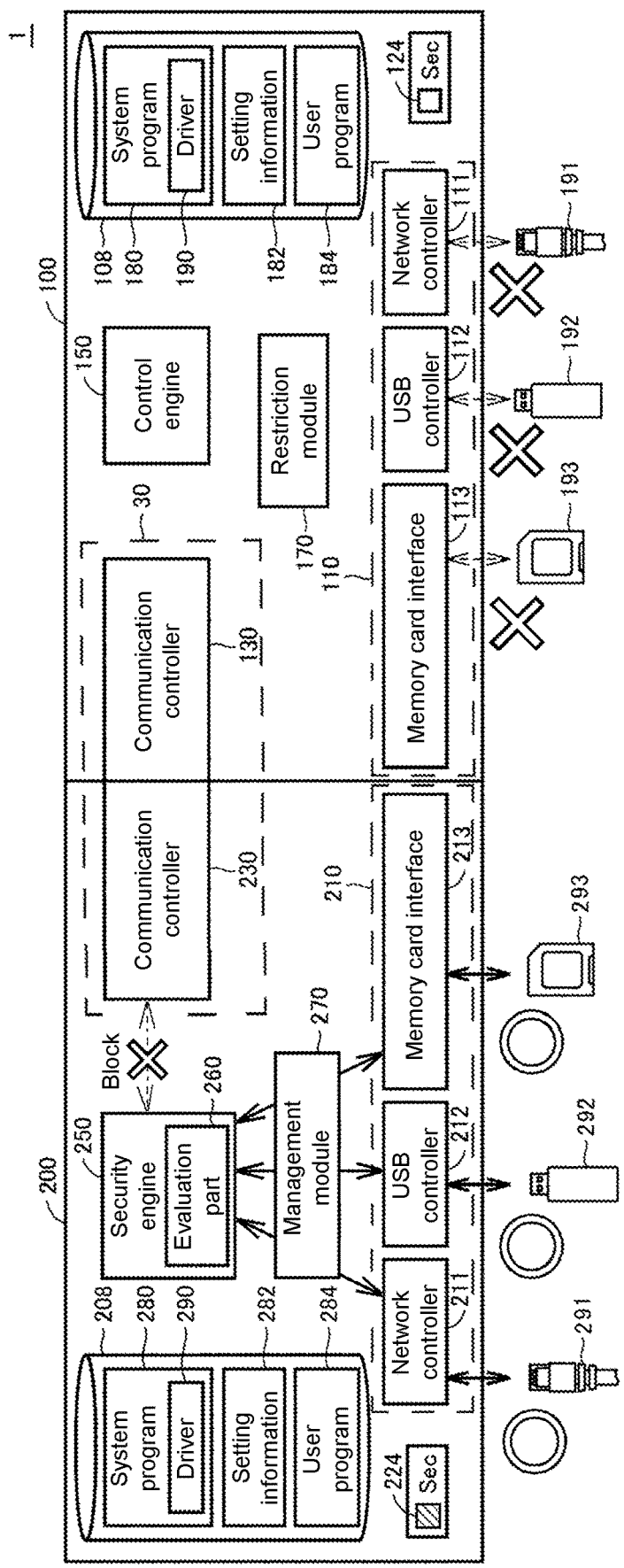
FIG. 9 is a diagram illustrating whether or not communication is possible according to the safety of data which is read out from an external device.

FIG. 9 is a diagram illustrating whether or not communication is possible according to the safety of data which is read out from an external device. Referring to FIG. 9, the security engine 250 in the security unit 200 includes an evaluation part 260. Other configurations in the controller system 1 of FIG. 9 are the same as the configurations described in (b) of FIG. 4.

The evaluation part 260 evaluates the safety of data that is exchanged with an external device. More specifically, the evaluation part 260 evaluates, for example, the safety of data that is read out from an external device to the security engine 250 through the second interface 210.

In a case where the safety of the data evaluated by the evaluation part 260 is less than a reference determined in advance, the management module 270 blocks the transmission of the data from the security engine 250 to the control engine 150 through the communication controller 30 as shown in FIG. 9. The data related to a reference for evaluating safety is stored in, for example, the secondary storage device 208, and is read out in a case where the evaluation part 260 performs the evaluation. Meanwhile, in a case where the safety of the data evaluated by the evaluation part 260 is equal to or greater than the reference determined in advance, the management module 270 transmits the data from the security engine 250 to the control engine 150 through the communication controller 30. This makes it possible for the controller system 1 to determine whether or not the data can be transmitted to the control unit 100 in accordance with the safety of the data that is read out from an external device through the second interface 210, and to more reliably reduce a threat to the security of the control unit 100.

Meanwhile, the management module 270 may determine whether to block or permit the transmission of data depending on whether the safety of the data satisfies conditions determined in advance. The management module 270 blocks the transmission of the data in a case where the safety of the data does not satisfy the conditions determined in advance.

On the other hand, the management module 270 permits the transmission of the data in a case where the safety of the data satisfies the conditions determined in advance.

The security unit 200 causes the indicator 224 to emit light or blink in a case where the safety of the data evaluated by the evaluation part 260 is less than the reference. Thereby, the controller system 1 can notify a user that the security unit 200 has detected data having low security safety. Meanwhile, in a case where the safety of the data evaluated by the evaluation part 260 is less than the reference, the indicator 124 provided in the control unit 100 may be caused to emit light or blink instead of the indicator 224. In addition, both the indicator 224 and the indicator 124 may be caused to emit light or the like. Further, in a case where the safety of the data evaluated by the evaluation part 260 is less than the reference, the security unit 200 may output acoustic information from a speaker (not shown) provided in the controller system 1 and notify a user.

Figure 10:
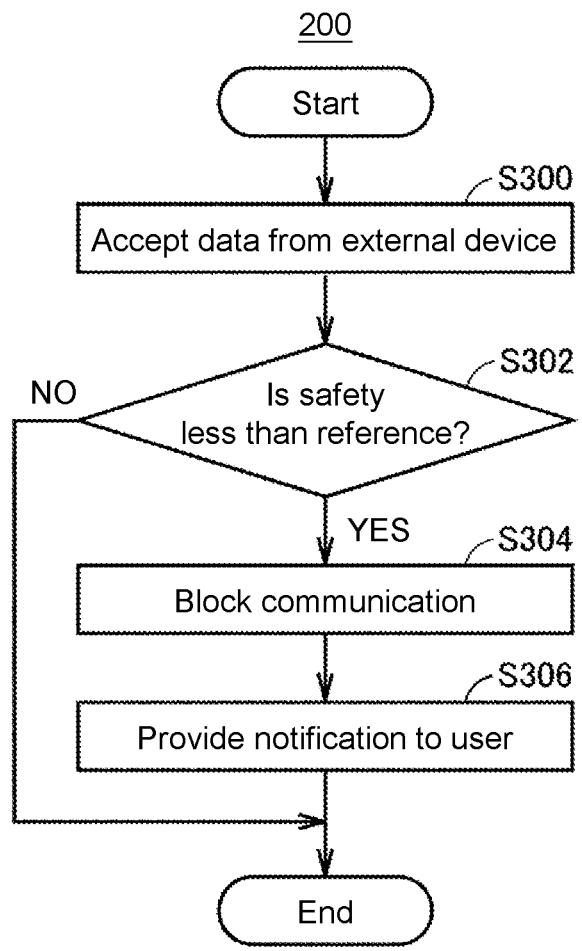
FIG. 10 is a flow chart illustrating a processing procedure according to the safety of data in the controller system 1.

FIG. 10 is a flow chart illustrating a processing procedure according to the safety of data in the controller system 1.

Referring to FIG. 10, the security engine 250 of the security unit 200 accepts data from an external device through the second interface 210 (step S300). The security engine 250 accepts, for example, the data from the SD memory card 293 through the memory card interface 213.

The evaluation part 260 of the security engine 250 determines the safety of the accepted data (step S302). The evaluation part 260 executes, for example, a virus scanning for determining whether or not a computer virus or the like is contained in the data.

In a case where the safety is less than the reference due to a virus or the like being contained in the data or the like (YES in step S302), the management module 270 blocks the transmission of the data from the security engine 250 to the control engine 150 through the communication controller 30 (step S304). In addition, the management module 270 may release the mount of an external device including the SD memory card 293, or may stop the supply of power to the external device.

The security engine 250 then causes the indicator 224 to turn on a light or blink (step S306).

Returning to the process of step S302, in a case where the safety is equal to or greater than the reference due to a virus or the like being contained in the data (NO in step S302), the security unit 200 ends the process of the present flow chart.
<F. Restriction in Memory Card Interface 113>

An example of a restriction on data exchange in the memory card interface 113 will be described below.

Figure 11:
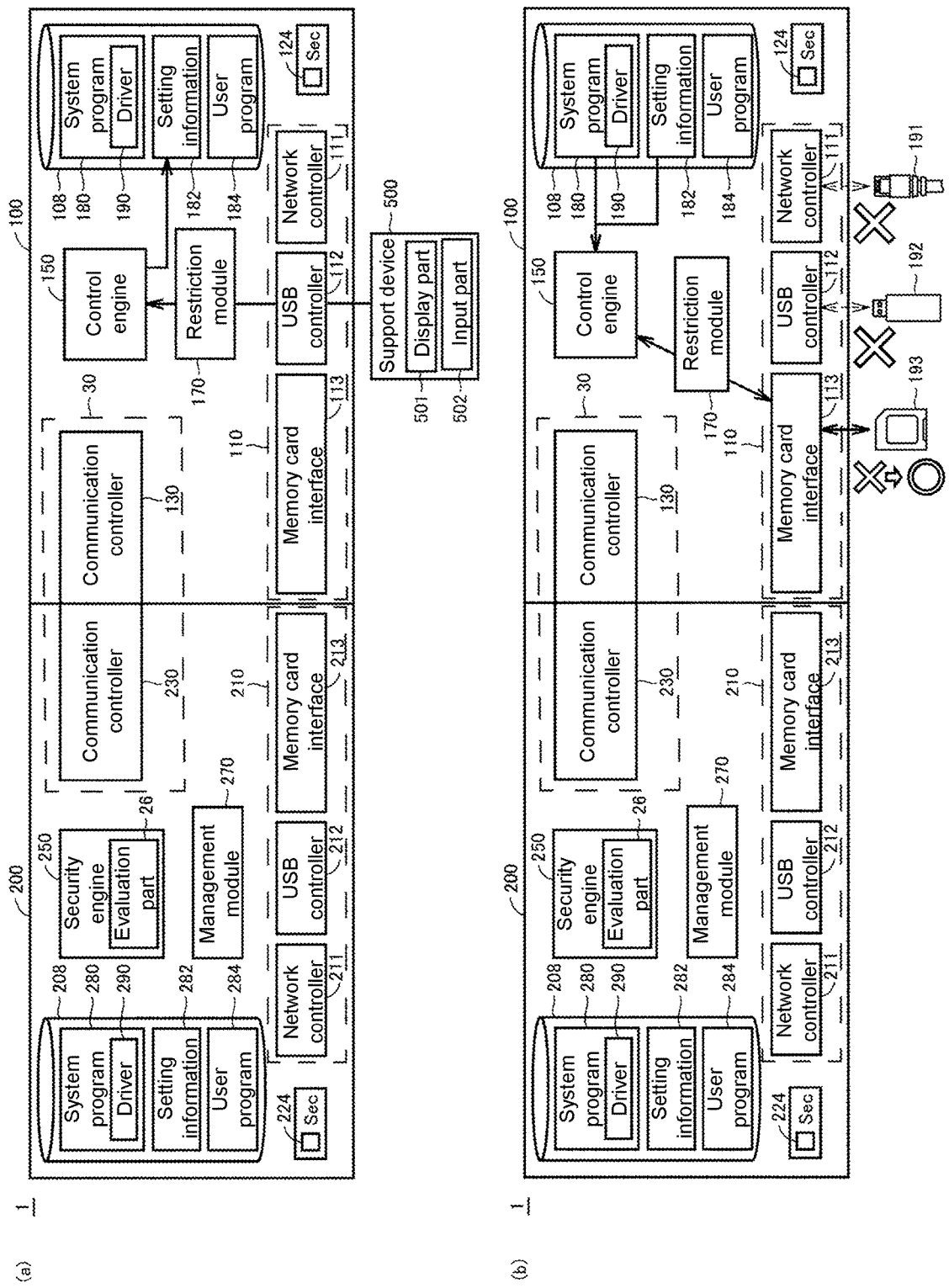
FIG. 11 is a diagram illustrating a change of setting information 182 and a restriction on data exchange using the changed setting information 182.

FIG. 11 is a diagram illustrating a change of the setting information 182 and a restriction on data exchange using the changed setting information 182. Referring to (a) of FIG. 11, the control unit 100 exchanges data for changing the setting information 182 with the support device 500 through the USB controller 112. More specifically, the control engine 150 accepts data for setting from the support device 500 which is electrically connected to the USB controller 112, and changes the setting information 182. The data for setting is generated by a user who has confirmed a setting screen displayed on the display part 501 of the support device 500 operating the operation input part 502.

Referring to (b) of FIG. 11, as described above, the processor 102 functions as the control engine 150 and the restriction module 170 by the system program 180 and the setting information 182 being developed in the main storage device 106. The restriction module prohibits reading and writing of the SD memory card through the memory card interface 113, for example, before the setting information 182 of (a) of FIG. 11 is changed. On the other hand, the restriction module permits reading and writing of the SD memory card through the memory card interface 113, for example, after the setting information 182 is changed.

FIG. 12 is a diagram illustrating an example of a case where setting information in the memory card interface 113 is changed. Referring to (a) of FIG. 12, the display part 501 of the support device 500 displays a first setting image 510. The first setting image 510 is an image which is displayed in a case where a user changes the setting information 182 by operating the operation input part 502. The first setting image 510 includes, a memory setting item 520, a USB setting item 522, and a network setting item 524. The memory setting item 520 is an item for setting a restriction on reading and writing of data in the memory card interface 113. The USB setting item 522 is an item for setting a restriction on reading and writing of data in the USB controller 112. The network setting item 524 is an item for setting a restriction on reading and writing of data in the network controller 111.

The item content of "Read Write NG" is set in the memory setting item 520 of the first setting image 510 in (a) of FIG. 12. The item content of "Not Used" is set in both the USB setting item 522 and the network setting item 524. Referring to (b) of FIG. 12, a memory setting list 610 includes "Setting Option" indicating items that can be set in the memory setting item 520 and "Description" indicating the contents of the items that can be set. The memory setting list 610 is stored in, for example, the secondary storage device 108 or the like. The memory setting list 610 is read out from the secondary storage device 108 by a user operating the operation input part 502, and an image of the memory setting list 610 is displayed on the display part 501. The user can confirm the content of an item that can be selected in the memory setting item 520 by the image of the memory setting list 610 being displayed on the display part 501.

The memory setting list 610 includes, for example, "Read Write NG" "Write Only," "Read Only," "Read Write OK (Redirect)," and "Read Write OK" in "Setting Option." In addition, the memory setting list 610 indicates the content of each item of "Setting Option" in "Description."

"Description" of "Read Write NG" indicates that reading and writing in the control unit 100 are prohibited. "Description" of "Write Only" indicates that only writing in the control unit 100 is permitted (reading is prohibited). "Description" of "Read Only" indicates that only reading in the control unit is permitted (writing is prohibited). "Read Write OK (Redirect)" prohibits writing in the control unit 100. However, it indicates that writing performed by the security unit 200 is permitted. "Description" of "Read Write OK" indicates that reading and writing in the control unit 100 is permitted.

Referring to (a) of FIG. 12 again, a user selects any of a plurality of items included in an item selection field 530 of the first setting image 510 by operating the operation input part 502. For example, when "Read Write OK" is selected, the content of the item in the memory setting item 520 is changed from "Read Write NG" to "Read Write OK." The change of the setting information 182 using the support device 500 in (a) of FIG. 11 described above is performed by the user operating the operation input part 502 to select any item. The content of the memory setting item 520 is changed from "Read Write NG" to "Read Write OK," and thus the exchange of data through the memory card interface 113 in (b) of FIG. 11 described above is changed from "prohibit reading and writing in the control unit 100" to "permit reading and writing in the control unit 100."

In the above-described contents, although settings for restricting the exchange of data through the memory card interface 113 have been described, such settings may be applied to other interfaces included in the first interface 110 other than the memory card interface 113, or may be applied to interfaces included in the second interface 210. The controller system 1 can set a restriction according to the security safety of each external device for each interface by changing the content of the setting information 182 using the support device 500.

<G Restriction in the USB Controller 112>

An example of a restriction on data exchange in the USB controller 112 will be described below.

Figure 13:
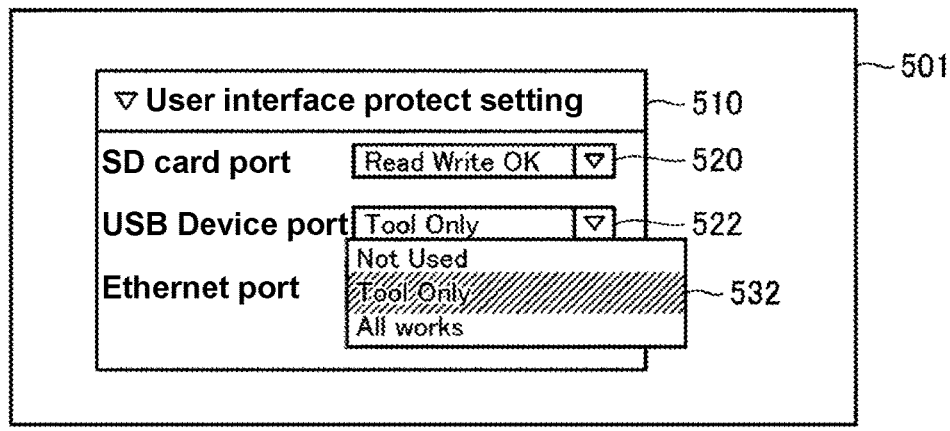
FIG. 13 is a diagram illustrating an example of a case where setting information in a USB controller 112 is changed.

FIG. 13 is a diagram illustrating an example of a case where setting information in the USB controller 112 is changed. Referring to (a) of FIG. 13, the display part 501 of the support device 500 displays the first setting image 510. The item content of "Not Used" is set in the USB setting item 522 in the first setting image 510 as described above, and is changed to, for example, "Tool Only" by the user operating the operation input part 502. The item content is changed to "Tool Only" in this manner, and thus the control unit 100 can exchange data only with an external device determined in advance. Thereby, the controller system 1 can prevent a security threat from an external device which is not previously permitted to exchange data.

Referring to (b) of FIG. 13, a USB setting list 612 includes "Setting Option" indicating items that can be set in the USB setting item 522 and "Description" describing the contents of the items that can be set. The USB setting list 612 is stored in, for example, the secondary storage device 108 or the like. The USB setting list 612 is read out from the secondary storage device 108 by the user operating the operation input part 502, and an image of the USB setting list 612 is displayed on the display part 501. The user can confirm the content of an item that can be selected in the USB setting item 522 by the image of the USB setting list 612 being displayed on the display part 501.

The USB setting list 612 includes, for example, "Not Used," "One-Way (Incoming Only)," "One-Way (Outgoing Only)," and "Two Way" in "Setting Option." In addition, the USB setting list 612 indicates the content of each item of "Setting Option" in "Description."

"Description" of "Not Used" indicates that reading and writing in the control unit 100 is prohibited. "Description" of "Tool Only" indicates that only reading performed by an external device determined in advance in the control unit 100 is permitted. "Description" of "All works" indicates that reading and writing in the control unit 100 is permitted. In the above-described contents, although settings for restricting the exchange of data through the USB controller 112 have been described, such settings may be applied to other interfaces included in the first interface 110 other than the USB controller 112, or may be applied to interfaces included in the second interface 210.

<H. Restriction in the Network Controller 111>

An example of a restriction on data exchange in the network controller 111 will be described below.

Figure 14:
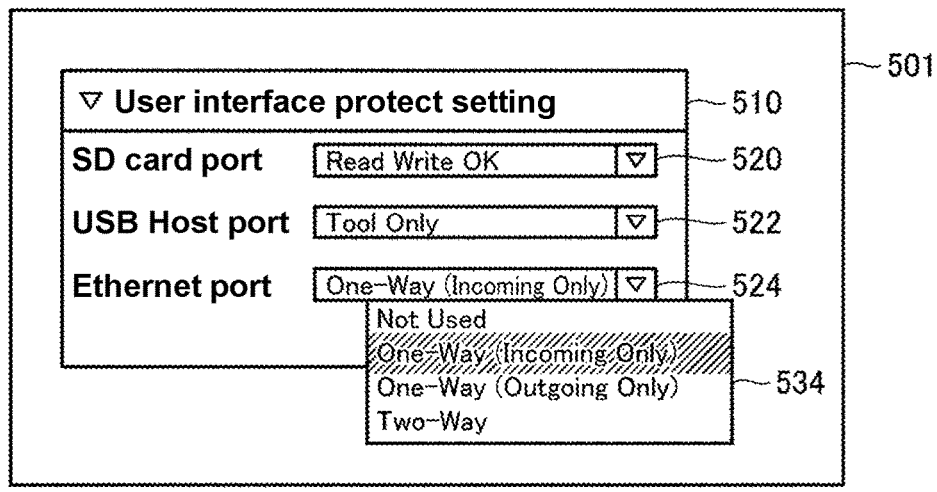
FIG. 14 is a diagram illustrating an example of a case where setting information in a network controller 111 is changed.

FIG. 14 is a diagram illustrating an example of a case where setting information in the network controller 111 is changed. Referring to (a) of FIG. 14, the display part 501 of the support device 500 displays the first setting image 510. The item content of "Not Used" is set in the network setting item 524 in the first setting image 510 as described above, and is changed to, for example, "One-Way (Incoming Only)" by the user operating the operation input part 502.

Referring to (b) of FIG. 14, a network setting list 614 includes "Setting Option" indicating items that can be set in the network setting item 524 and "Description" describing the contents of items that can be set. The network setting list 614 is stored in, for example, the secondary storage device 108 or the like. The network setting list 614 is read out from the secondary storage device 108 by the user operating the operation input part 502, and an image of the network setting list 614 is displayed on the display part 501. The user can confirm the content of each item that can be selected in the network setting item 524 by the image of the network setting list 614 being displayed on the display part 501.

The network setting list 614 includes, for example, "Not Used," "One-Way (Incoming Only)," "One-Way (Outgoing Only)," and "Two-Way" in "Setting Option." In addition, the USB setting list 612 indicates the content of each item of "Setting Option" in "Description."

"Description" of "Not Used" indicates that reading and writing in the control unit 100 is prohibited. "Description" of "One-Way (Incoming Only)" indicates that only reception in the control unit 100 is permitted (transmission is prohibited). "Description" of "One-Way (Outgoing Only)" indicates only transmission in the control unit 100 is permitted (reception is prohibited). "Description" of "Two-Way" indicates that bidirectional communication of transmission and reception is permitted.

In the above-described contents, although settings for restricting the exchange of data through the network controller 111 have been described, such settings may be applied to other interfaces included in the first interface 110 other than the network controller 111, or may be applied to interfaces included in the second interface 210.

<I. Other Restrictions>

An example of other restrictions on data exchange will be described below. As an example of other data exchange, another example of a case where setting information in the USB controller 112 is changed will be described.

Figure 15:
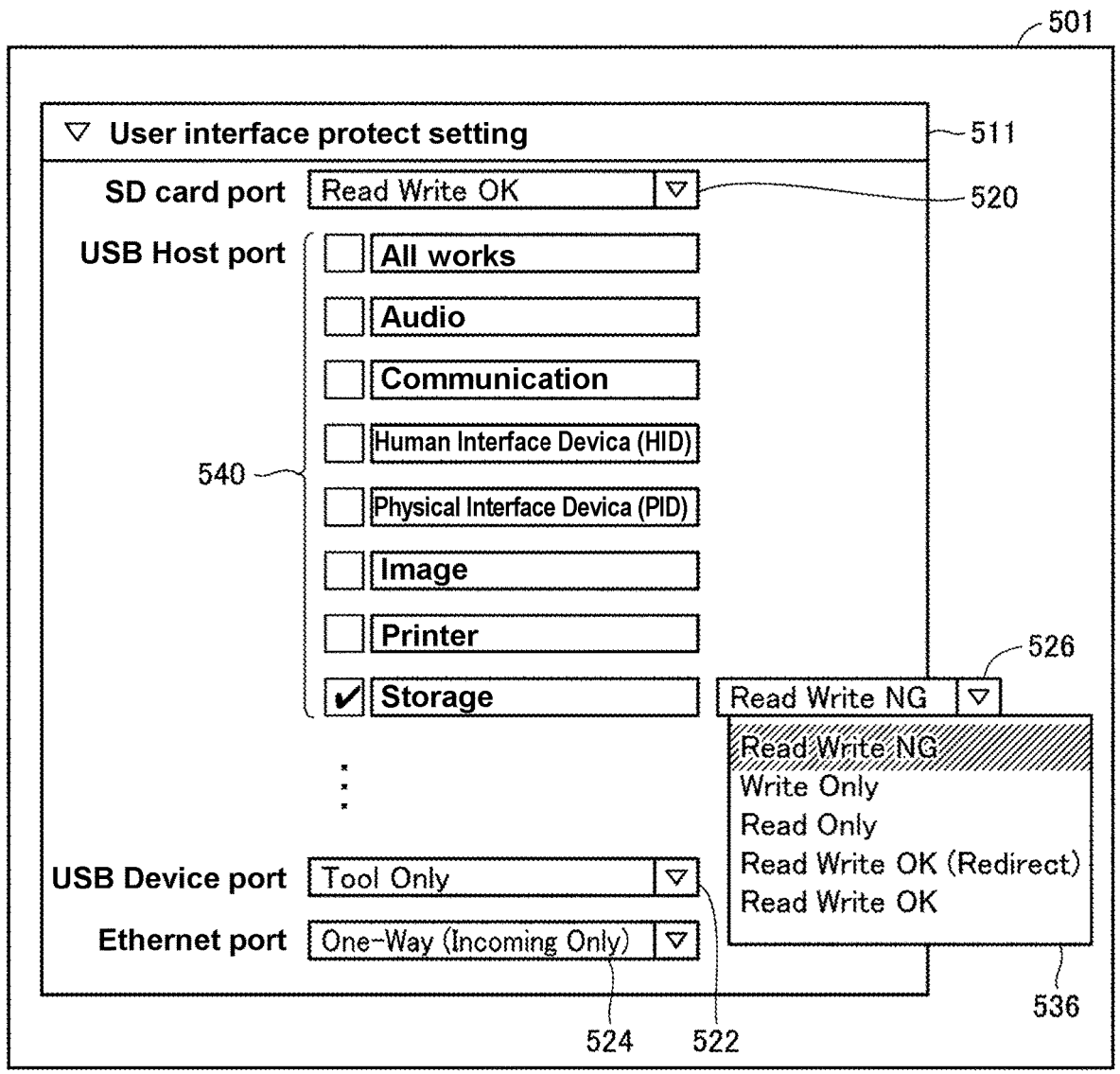
FIG. 15 is a diagram illustrating another example of a case where the setting information in the USB controller 112 is changed.

FIG. 15 is a diagram illustrating another example of a case where setting information in the USB controller 112 is changed. Referring to FIG. 15, the display part 501 of the support device 500 displays a second setting image 511. A device setting item 540 of the second setting image 511 shows each setting item of a plurality of devices connected by USB. By the user operating the operation input part 502, for example, the device of "Storage" is selected among the plurality of devices included in the device setting item 540, and the item content of a setting item 526 of the "Storage" is selected from an item selection field 536. "Read Write NG" is selected from the item selection field 536 by the user's operation using the operation input part 502, and thus the content of the setting item 526 is changed. The controller system 1 can change the setting item of each of the device connected by USB.

<J. Addition>

As will be stated below, the present embodiment includes the following disclosures.

[Configuration 1]

A controller system (1) including:
a control unit (100) that executes a control calculation for controlling a controlled object; and
a security unit (200) that is responsible for security of the control unit,
wherein the control unit (100) includes
a first interface (110) that mediates an exchange of data with an external device, a communication controller (30) that is responsible for communication with the security unit (200), and a restriction means (170) for restricting the data from being exchanged with the external device through the first interface (110) when a connection between the control unit (100) and the security unit (200) is detected through the communication controller (30).

[Configuration 2]

The controller system according to configuration 1, wherein the security unit (200) further includes:

a second interface (210) that mediates an exchange of data with the external device; and a management means (270) for managing an exchange of the data with the external device through the second interface (210), wherein the management means (270) permits the control unit (100) to exchange the data with the external device through the second interface (210) in a case where use of the first interface (110) is restricted by the restriction means (170).

[Configuration 3]

The controller system according to configuration 2, wherein the restriction means (170) transmits data for the control unit (100) to write to the external device through the first interface (110) to the security unit (200) through the communication controller (30) in a case where the use of the first interface (110) is restricted, and the management means (270) permits the transmitted data for writing to be written to the external device through the second interface (210).

[Configuration 4]

The controller system according to configuration 2, wherein the security unit (200) further includes an evaluation part (260) that evaluates safety of data that is exchanged with the external device, and the management means (270) transmits the data to the control unit (100) in a case where the safety of the data that is exchanged with the external device is equal to or greater than a reference determined in advance, and stops transmitting the data to the control unit (100) in a case where the safety of the data is less than the reference.

[Configuration 5]

The controller system according to configuration 4, wherein the security unit (200) further includes a notification means (224) for providing a notification to a user, and the notification means (224) provides a notification in a case where the safety of the data that is exchanged with the external device is less than the reference.

[Configuration 6]

The controller system according to configurations 2, where the external device is a storage medium capable of being attached to and detached from at least any of the first interface (110) and the second interface (210).

[Configuration 7]

The controller system according to configurations 1, wherein the restriction means (170) performs any of only reading out data to and from the external device, only writing data to and from the external device, and prohibiting reading out and writing data to and from the external device.

[Configuration 8]

The controller system according to configurations 1, wherein the restriction means (170) exchanges the data only with the external device determined in advance.

[Configuration 9]

A control unit (100) that executes a control calculation for controlling a controlled object, the control unit including:

a first interface (110) that mediates an exchange of data with an external device;

a communication controller (30) that is responsible for communication with a security unit (200) that is responsible for security of the control unit (100); and a restriction means (170) for restricting the data from being exchanged with the external device through the first interface (110) when a connection between the control unit (100) and the security unit (200) is detected through the communication controller (30).

[Configuration 10]

A non-transitory computer readable medium storing a control program of a control unit (100) that executes a control calculation for controlling a controlled object, the control program causing the control unit (100) to execute:

a step (S202) of detecting a connection between the control unit (100) and the security unit (200) through a communication controller (30) that is responsible for communication with a security unit (200) that is responsible for security of the control unit (100); and a step (S209) of maintaining a state in which data is restricted from being exchanged with an external device through a first interface (110) that mediates an exchange of the data with the external device.

The invention claimed is:

1. A controller system comprising:

a control unit including a first processor that executes a control calculation for controlling a controlled object; and a security unit including a second processor that is responsible for security of the control unit, wherein the control unit includes a first interface that mediates an exchange of data between the first processor and an external device directly coupled to the first interface, a communication controller, different from the first interface, configured to communicatively couple the control unit to the security unit and mediate an exchange of data between the first processor and other external device directly coupled to the security unit, wherein the first processor is further configured to:

detect a physical connection between the control unit and the security unit through the communication controller, and restrict all communication with the external device through the first interface in response to the detection of the physical connection between the control unit and the security unit through the communication controller and allow communication with the other external device directly coupled to the security unit through the communication controller as the communication through the first interface is restricted.

2. The controller system according to claim 1, wherein the security unit further includes:

a second interface that mediates the exchange of data with the other external device; and the second processor for managing the exchange of the data with the other external device through the second interface, wherein the second processor permits the control unit to exchange the data with the other external device through the second interface in a case where use of the first interface is restricted.

3. The controller system according to claim 2, wherein the the second processor permits transmission of data for writing to be written to the other external device through the second interface.

4. The controller system according to claim 2, wherein the the second processor is further configured to evaluate safety of the data that is exchanged with the other external device, and the second processor transmits the data to the control unit in a case where the safety of the data that is exchanged with the other external device is equal to or greater than a reference determined in advance, and stops transmitting the data to the control unit in a case where the safety of the data is less than the reference.

5. The controller system according to claim 4, wherein the the second processor is further configured to provide a notification to a user, and the second processor provides a notification in a case where the safety of the data that is exchanged with the other external device is less than the reference.

6. The controller system according to claim 2, where the external device is a storage medium configured to be attached to and detached from at least any of the first interface and the second interface.

7. The controller system according to claim 1, wherein the first processor performs any of only reading out data to and from the external device, only writing data to and from the external device, and prohibiting reading out and writing data to and from the external device.

8. The controller system according to claim 1, wherein the first processor exchanges the data only with the external device determined in advance.

9. The controller system according to claim 1, wherein the control unit is further configured to enable the exchange of the data between the external device and the control unit through the first interface when a disconnection between the control unit and the security unit is detected through the communication controller.

10. A control unit that executes a control calculation for controlling a controlled object, the control unit comprising:

a first interface that mediates an exchange of data with an external device directly coupled to the first interface, a communication controller, different from the first interface, and configured to communicatively couple the control unit to a security unit and mediate an exchange of data between the control unit and other external device directly coupled to the security unit; and wherein the control unit is configured to:

detect a physical connection between the control unit and the security unit through the communication controller, and restrict all communication with the external device through the first interface in response to the detection of the physical connection between the control unit and the security unit through the communication controller and allow communication with the other external device directly coupled to the security unit through the communication controller as the communication through the first interface is restricted.

11. A non-transitory computer readable medium storing a control program of a control unit that executes a control calculation for controlling a controlled object, the control program causing the control unit to execute:

a step of detecting a connection between the control unit and a security unit through a communication controller that is configured to mediate an exchange of data between the control unit and other external device directly coupled to the security unit;

a step of maintaining a state in which all data is restricted from being exchanged with an external device through a first interface that mediates an exchange of the data between the control unit and the external device directly coupled to the first interface in response to the detection of a physical connection between the control unit and the security unit through the communication controller, wherein the communication controller is different from the first interface; and a step of allowing communication with the other external device directly coupled to the security unit through the communication controller as the communication through the first interface is restricted.

* * * * *